Figure 1:
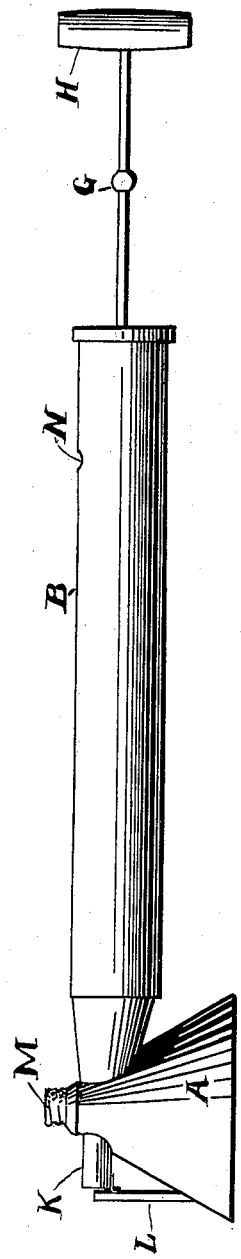

No. 614,384. Patented Nov. 15, 1898.
I. F. GORDON.
SPRAYING DEVICE.
(Application filed Oct. 14, 1897.)

(No Model.)

WITNESSES:
Harry J Perkins.
Dora B. Parker

INVENTOR
Ira F. Gordon
BY
Edward Taggart
His - ATTORNEY

UNITED STATES PATENT OFFICE.

IRA F. GORDON, OF TRAVERSE CITY, MICHIGAN.

SPRAYING DEVICE.

SPECIFICATION forming part of Letters Patent No. 614,384, dated November 15, 1898.

Application filed October 14, 1897. Serial No. 655,198. (No model.)

*To all whom it may concern:*

Be it known that I, IRA F. GORDON, a citizen of the United States, residing at Traverse City, in the county of Grand Traverse and State of Michigan, have invented a certain new and useful Spraying Device, of which the following is a specification.

This invention relates to certain new and useful improvements in spraying devices for converting liquids into a spray by means of an air-blast; and the invention consists in the combination of parts and the details of construction hereinafter particularly described.

The objects of this invention are, first, to combine in a single device of the general form shown in the drawings an efficient spraying device for the purpose of applying insecticides to plants, bushes, small trees, and the like; second, to combine a liquid-receptacle with an air-compressing cylinder having an extension passing entirely through the liquid-receptacle and rigidly secured thereto; third, to construct a spraying device which will combine cheapness and durability, and, fourth, other objects particularly described in this specification. These objects are accomplished by means of the mechanism illustrated in the accompanying drawings, in which—

Figure 2:
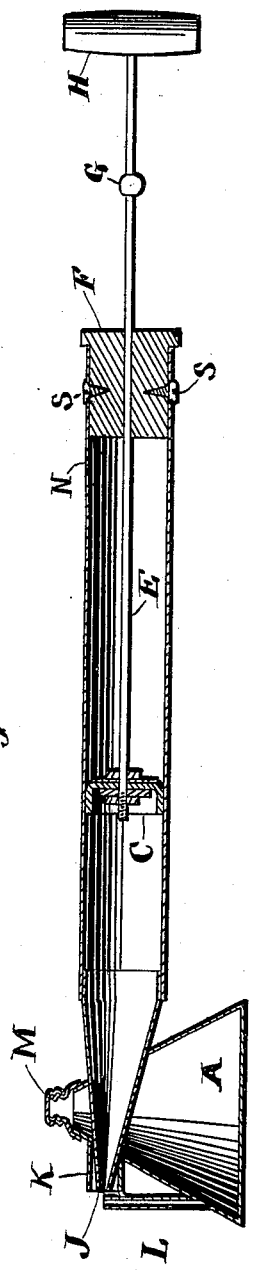

Figure 1 is a side elevation of the spraying device, and Fig. 2 is a vertical sectional view of the same.

Like letters refer to like parts in both views.

A is a liquid-receptacle which is preferably conical in form, having the lower part much enlarged, so that the liquid is mostly contained in the bottom or enlarged portion. This form also has the advantage of retaining the vessel in an upright position when the handle is turned in the direction shown in the drawings.

B is an air-compressing cylinder, which cylinder is of such size and shape as to form a handle for the entire device. The cylinder is contracted, as shown in the drawings, as it approaches the liquid-receptacle A, and it passes entirely through the receptacle and terminates in the spraying-nozzle J. For cheapness I construct the cylinder and liquid-receptacle of tin or other similar material, and the air-compressing cylinder is securely fastened by solder both at the point where it enters the liquid-receptacle and at the point where it passes through on the opposite side, thus making a very rigid and secure attachment between the air-compressing cylinder and the liquid-receptacle. This I deem of great importance for the reason that spraying devices designed for the purposes above designated are liable to be broken or injured by use, and by constructing a receptacle and spraying-cylinder substantially in one part, as above described, it adds greatly to the durability and efficiency thereof. In order to still further protect the spraying-nozzle J, I provide the cylindrical guard K, as shown in the drawings.

C is the plunger or piston, adapted to move in the cylinder B, being provided with a piston rod or stem E, which stem is also provided with a handle H and a stop G.

F is a cylinder-head which may be constructed of wood or any other suitable material and which is fitted securely within the end of the cylinder B and is secured therein by the screws S S, the stop G limiting the movement of the piston C when the same is moved upward by means of the handle H and rod E until said stop G comes in contact with the cylinder-head F. By the use of the screws S S the cylinder-head may be readily removed, and when removed the piston may also be removed for the purpose of repairing. I also provide an air-outlet N, designed to allow the air to escape from the cylinder when the piston is drawn outwardly.

L is a tube adapted to convey the liquid from the chamber A to a point where it will be sprayed by means of the spraying-nozzle J, the general position of the spraying-nozzle J and the upper end of the tube L being the same as is used in ordinary spraying devices. Near the upper end of the tube L the same is attached to the lower part of the guard K, thereby retaining the same securely in position at its upper end. The tube L passes through the wall of the liquid-receptacle A, near one side of the said receptacle, and extends downward to a point near the bottom of the receptacle A, leaving, however, a space between the lower end of said tube L and said receptacle A of sufficient width to allow the liquids to pass freely into the tube L, the liquid being raised by means of the air-blast from the nozzle J and there sprayed by means of the compression of the air in the cylinder B.

M is a cap, preferably provided with a screw-thread to engage with the upper end of the receptacle A and close the opening therein. Instead of the cap any suitable means may be used for closing the opening.

Having thus described my invention, what I claim to have invented, and desire to secure by Letters Patent, is—

1. In a spraying device, the combination with a liquid-receptacle A, having a transverse opening through the body thereof, of a cylinder B, which passes through the opening in the said receptacle, terminating at one end in a spraying-nozzle, a guard K, surrounding the said nozzle, a conveying-tube L, having its upper end in close proximity to the spraying-nozzle and its lower end extending downward through the side wall of the receptacle and terminating at a point near the bottom of the same, and means for forcing air through the spraying-cylinder, substantially as described.

2. In a spraying device, the combination with a liquid-receptacle A, conical in form, an air-compressing cylinder B, contracted toward said receptacle to provide a spraying-nozzle J, which is passed through an opening in the said receptacle, a guard K, fixed to the receptacle and surrounding the said nozzle, a plunger or piston C, moving in said cylinder, a detachable head F, in the end of the cylinder, a piston-rod E, secured to the piston and extending through an opening in the head and provided with a handle H, at its free end, a stop G, on the piston-rod adapted to abut against the said head for the purpose specified, and a conveying-tube L, leading from the lower part of the receptacle to the spraying-nozzle and supported at its upper end by the guard K, substantially as described.

3. The combination of the liquid-receptacle, A, the air-compressing cylinder, B, the piston, C, adapted to move in the cylinder, B, the piston-rod, E, the handle, H, the conveying-tube, L, having its upper end in proximity to the spraying-nozzle, J, extending downwardly through the side wall of said liquid-receptacle, and a guard, K, surrounding and protecting the spraying-nozzle, J, and also forming a support for the tube, L, all constructed and operated substantially as described.

In witness whereof I have hereunto set my hand and seal in the presence of two witnesses.

IRA F. GORDON. [L. S.]

Witnesses:
L. SOULE,
FRED J. ROBINSON.